United States Patent [19]

Pollington

[11] Patent Number: 4,488,840
[45] Date of Patent: Dec. 18, 1984

[54] ROTARY CUTTING TOOL

[76] Inventor: Bernard M. Pollington, 110 6th St., Marion, Mich. 49665

[21] Appl. No.: 396,242

[22] Filed: Jul. 8, 1982

[51] Int. Cl.³ .............................................. B23B 29/10
[52] U.S. Cl. ................................... 408/231; 408/199; 408/233; 408/713
[58] Field of Search ................. 408/199, 266, 713, 59, 408/238, 144, 233, 231; 407/35, 103, 50, 91, 110; 175/383

[56] References Cited

U.S. PATENT DOCUMENTS

| | | | |
|---|---|---|---|
| 994,668 | 6/1911 | Childs | 175/383 |
| 1,881,024 | 10/1932 | Lang | 175/327 |
| 2,575,239 | 11/1951 | Stephens | 408/226 X |
| 2,590,053 | 3/1952 | Taylor | 408/226 X |
| 2,689,131 | 9/1954 | Priest | 279/101 |
| 3,066,385 | 12/1962 | Vana | 407/110 |
| 3,076,357 | 2/1963 | Bengamin et al. | 408/233 |
| 3,170,224 | 2/1965 | Johnson | 29/103 |
| 3,376,763 | 4/1968 | Welles | 408/199 |
| 3,878,905 | 4/1975 | Schaumann | 408/713 |
| 3,963,366 | 6/1976 | Eckle et al. | 408/199 |
| 4,047,826 | 9/1977 | Bennett | 408/199 X |
| 4,060,335 | 11/1977 | Holloway et al. | 407/54 X |
| 4,278,373 | 7/1981 | Wolfe | 408/199 X |
| 4,293,253 | 10/1981 | Ott | 408/226 |
| 4,355,932 | 10/1982 | Koppelmann et al. | 175/383 X |

FOREIGN PATENT DOCUMENTS 2044012  5/1979  Fed. Rep. of Germany ...... 408/713

Primary Examiner—William R. Briggs
Assistant Examiner—Glenn L. Webb
Attorney, Agent, or Firm—Gifford, VanOphem, Sheridan, Sprinkle & Nabozny

[57] ABSTRACT

A rotary cutting tool which comprises an elongated body attached to be rotatably driven around its longitudinal axis. An axially extending slot is formed at one end of the body while a cutting insert having a cutting edge is axially insertable into the slot. A pair of diverging abutment surfaces on the body extend inwardly into the slot. These abutment surfaces cooperate with diverging mounting edges formed on the cutting insert to automatically orient the cutting insert upon insertion into the slot to a predetermined position with respect to the body. The cutting insert is secured to the body in a conventional manner, such as soldering.

5 Claims, 4 Drawing Figures

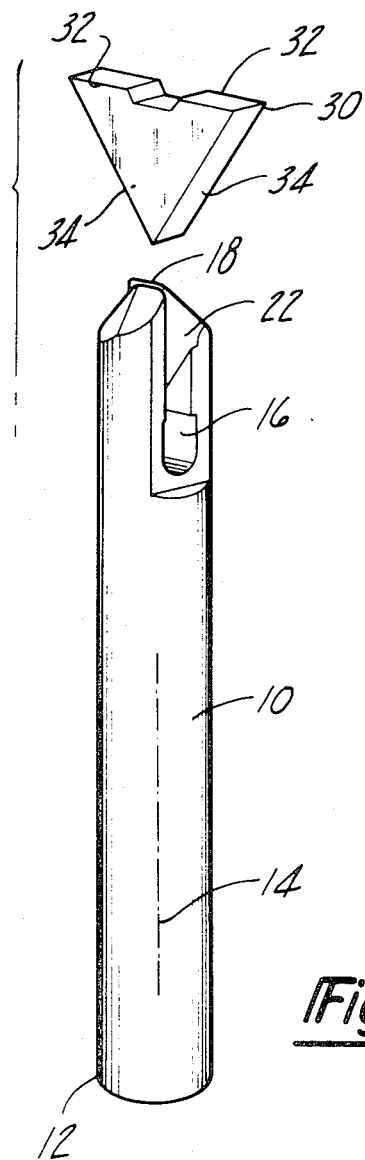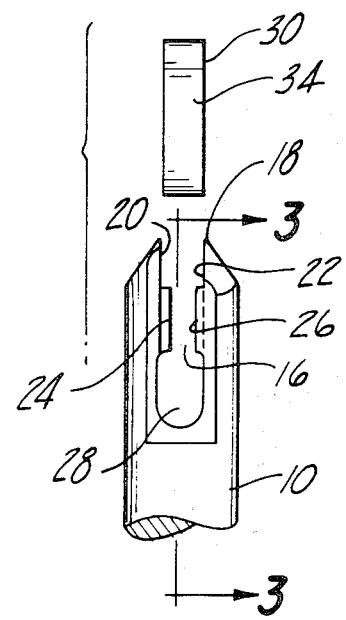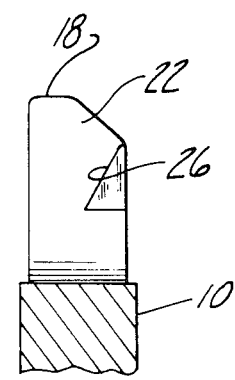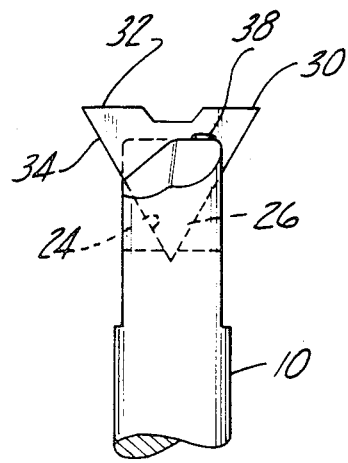
Fig-1
Fig-2
Fig-3
Fig-4

ROTARY CUTTING TOOL

BACKGROUND OF THE INVENTION

I. Field of the Invention

The present invention relates generally to cutting tools and, more particularly, to a rotary cutting tool.

II. Description of the Prior Art

There are a number of previously known rotary cutting tools in which a cutting insert or blade is secured to one end of an elongated body. The body in turn is adapted to be rotatably driven about its axis by a rotary drive machine. In addition, a number of these previously known rotary cutting tools have cutting inserts which are detachably secured to one end of the body.

One disadvantage of the previously known cutting tools with detachable inserts is that it is difficult to properly align the cutting insert to a predetermined position with respect to the body. An improperly aligned cutting insert causes the cutting tool to drill or bore a hole other than its intended size.

SUMMARY OF THE PRESENT INVENTION

The present invention provides a cutting tool which overcomes the above mentioned disadvantages of the previously known devices.

In brief, the cutting tool of the present invention comprises an elongated body adapted to be rotatably driven around its longitudinal axis. An axially extending slot is formed at one end of the body and a generally planar cutting insert having at least one cutting edge is insertable into the slot.

The cutting insert includes a pair of mounting edges which diverge away each other at a predetermined angle. These mounting edges engage a pair of abutment surfaces formed on the body and which extend inwardly into the slot. These abutment surfaces also diverge away from each other at the same predetermined angle as the mounting edges of the cutting insert. Moreover, the abutment surfaces lie in a plane perpendicular to the axis of the body, and in a plane perpendicular to the sides of the cutting insert. Thus, upon insertion of the cutting insert into the slot, the coaction between the mounting edges and abutment surfaces automatically orients the cutting tool to a predetermined position with respect to the body. The cutting insert is then secured to the body in any conventional fashion, such as by soldering.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational exploded view illustrating a preferred embodiment of the cutting tool of the present invention;

FIG. 2 is a fragmentary side view of the preferred embodiment of the invention;

FIG. 3 is a fragmentary partial sectional view taken substantially along line 3—3 in FIG. 2; and FIG. 4 is a side view illustrating the preferred embodiment of the invention.

DETAILED DESCRIPTION OF A PREFERRED EMBODIMENT OF THE PRESENT INVENTION

With reference first to FIGS. 1 and 2, a preferred embodiment of the cutting tool of the present invention is thereshown and comprises an elongated body 10 which is generally cylindrical in cross section. One end 12 of the body 10 is adapted to be received within the chuck of a rotary drive machine (not shown). The rotary drive machine, upon activation, rotatably drives the body 10 about its longitudinal axis 14.

Still referring to FIGS. 1 and 2, an axially extending slot 16 is formed in and open to the other axial end 18 of the body 10. The slot 16 thus has two sides 20 and 22 which are spaced apart from each other by a predetermined amount.

With reference now to FIGS. 1-4, a linear abutment surface 24 (FIG. 4) extends inwardly into the slot 16 from the side 20. Similarly, a second abutment surface 26 extends inwardly into the slot 16 from the opposite side 22 of the slot 16. The abutment surfaces 24 and 26 are symmetrical about the axis 14 of the body 10 and diverge outwardly from each other and towards the end 18 of the body 10. The inner end of both abutment surfaces 24 and 26 terminate in an enlarged clearance hole 28 formed diametrically through the boring bar 10.

With reference now to FIGS. 1, 2 and 4, the cutting tool further comprises a generally planar cutting insert 30. The insert 30 is generally triangular in shape and has at least one and preferably two cutting edges 32 (FIG. 1) formed on one side of the insert 30. The other two sides of the insert 30 form mounting edges 34 which diverge away from each other by the same angle that the abutment surfaces 24 and 26 diverge away from each other. As also shown in the drawing, the mounting edges 34 and abutment surfaces 24 and 26 lie in a plane substantially perpendicular to the axis of the body 10, and in a plane perpendicular to the planar sides of insert 30.

With reference now particularly to FIGS. 2 and 4, the thickness of the cutting insert 30 is substantially the same as the width of the slot 16 so that the insert 30 is axially slidably insertable within the slot 16 from the position shown in FIG. 2 and to the position shown in FIG. 4. In doing so, the mounting edges 34 engage the abutment surfaces 24 and 26 and, with the mounting edges 34 flatly abutting against the abutment surfaces 24 and 26, automatically orient the cutting insert 30 to the predetermined position shown in FIG. 4. A clearance hole 28 (FIG. 2) prevents the cutting insert 30 from contacting the bottom of the slot 16. In addition, as shown in FIG. 2, the inner ends of the abutment surfaces 24 and 26 are spaced apart from each other in the direction perpendicular to the axis of said body and perpendicular to the slot.

With reference now particularly to FIG. 4, with the cutting insert 30 positioned within the slot so that both of its mounting surfaces 34 abut against the abutment surface 24 and 26, the cutting insert 30 is secured to the body 10 in any conventional fashion. As shown, however, the cutting insert 30 is secured to the body 10 by solder 38. When the cutting insert 30 becomes dull, it can then be easily removed from the body 10 by desoldering and replaced with a new or sharpened cutting insert 30.

The cutting tool of the present invention is thus advantageous in that the cutting insert 30 is automatically aligned to a predetermined position with respect to the body 10 upon the insertion of the cutting insert 30 into the slot 16. Furthermore, such alignment and orientation of the cutting insert 30 with respect to the body 10 can be done manually and without the need for any special tooling or fixtures.

Having described my invention, however, many modifications thereto will become apparent to those skilled in the art to which it pertains without deviation from the spirit of the invention as defined by the scope of the appended claims.

I claim:

1. A rotary cutting tool comprising:
   an elongated body adapted to be rotatably driven around its longitudinal axis, said body having an axially extending slot formed at one end,
   a triangular and planar cutting insert having two sides, a cutting edge and two mounting edges, said mounting edges forming a corner and diverging from each other at a predetermined angle and lying in a plane perpendicular to the sides of the cutting insert,
   a pair of abutment surfaces formed on said body and extending inwardly into said slot, said abutment surfaces diverging from each other at said predetermined angle,
   said cutting insert being insertable into said slot so that said mounting edge engage said abutment surfaces and orient said cutting insert to a predetermined position with respect to body,
   means for securing said cutting insert to said body,
   wherein one abutment surface extends inwardly into said slot from one side of said slot and wherein the other abutment surface extends inwardly into said slot from the other side of said slot, said abutment surfaces each having an inner end, said inner ends lying in parallel planes and being spaced from each other in the direction perpendicular to the axis of said body and perpendicular to said slot and forming a space therebetween, said corner being positioned through said space, and
   wherein said abutment surfaces lie in a plane perpendicular to the axis of said body so that said mounting edges and said abutment surfaces flatly abut against each other.

2. The invention as defined in claim 1 wherein said securing means comprises means for detachably securing said cutting insert to said body.

3. The invention as defined in claim 1 wherein said abutment surfaces are symmetrical about the axis of said body.

4. The invention as defined in claim 3 wherein said cutting tool insert comprises a second cutting edge.

5. The invention as defined in claim 1 wherein said cutting edge are formed along one edge of said insert.

* * * * *